(12) United States Patent
Tan

(10) Patent No.: US 6,751,248 B1
(45) Date of Patent: Jun. 15, 2004

(54) METHOD FOR NODES IN A MULTI-HOP WIRELESS NETWORK TO ACQUIRE AND MAINTAIN SYNCHRONIZATION WITH A MASTER NODE

(75) Inventor: Narciso Lau Tan, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/455,666

(22) Filed: Dec. 7, 1999

(51) Int. Cl.[7] .......................... H04B 1/713; H04B 7/212
(52) U.S. Cl. ..................................... 375/132; 370/337
(58) Field of Search ................................. 370/338, 401; 375/132, 256, 131

(56) References Cited

U.S. PATENT DOCUMENTS

| | | | |
|---|---|---|---|
| 5,394,436 A | | 2/1995 | Meier et al. ............... 375/202 |
| 5,428,636 A | * | 6/1995 | Meier ......................... 375/132 |
| 5,719,868 A | * | 2/1998 | Young ......................... 370/436 |
| 6,317,436 B1 | * | 11/2001 | Young et al. ............... 370/443 |
| 6,331,973 B1 | * | 12/2001 | Young et al. ............... 370/337 |
| 6,374,311 B1 | * | 4/2002 | Mahany et al. ............ 710/18 |
| 6,504,829 B1 | * | 1/2003 | Young et al. ............... 370/337 |
| 6,574,206 B2 | * | 6/2003 | Young ......................... 370/337 |
| 6,600,754 B1 | * | 7/2003 | Young et al. ............... 370/459 |

* cited by examiner

Primary Examiner—Stephen Chin
Assistant Examiner—Lawrence Williams

(57) ABSTRACT

The present invention is directed to a method of selecting nodes in a multi-hop network having a combined coverage that reaches all the nodes in the network. These nodes called parent nodes, together with the root broadcast synchronization information regularly to the rest of the network. As part of the selection process, the parent nodes that would not interfere with each other are identified and then scheduled to broadcast synchronization information at the same time. Further, a time division structure can be used to control the access of these parent nodes to a common communication channel, resulting in the efficient use of the bandwidth available. The time division structure also ensures that each node receives regular synchronization information so that it can acquire and maintain synchronization with the root. However, other structures are also contemplated such as frequency division, code division and hybrids. Further, minimal coordination between the nodes is required to implement this method and timing structure.

12 Claims, 8 Drawing Sheets

METHOD FOR NODES IN A MULTI-HOP WIRELESS NETWORK TO ACQUIRE AND MAINTAIN SYNCHRONIZATION WITH A MASTER NODE

BACKGROUND OF THE INVENTION

The present invention generally relates to wireless networks, and more particularly to a method for transmitting synchronization information within a multi-hop network to enable the nodes in the network to acquire and maintain synchronization with a master node.

Many wireless networks require the included nodes to be time synchronized with one another. Some require this synchronization for the purpose of controlling access to a shared communication medium, some for coordinated transfer of global information, and for others, it is required for synchronous and time-stamping applications in the network. A central controller broadcasting synchronization information to all its nodes typically accomplishes the synchronization. In this case, all the nodes become synchronized with the clock residing in the central controller, i.e. the master clock. An example of this type of system would be a cellular system where the base station is the central controller and the cell phones are the nodes.

Another example is an IEEE 802.11 wireless infrastructure network, where the access point is the central controller and the wireless stations are the nodes. This method of synchronization works well when all the nodes of the network are in the transmission range of the central controller.

Another type of network that requires synchronization among its nodes to operate properly is the IEEE 802.11 ad-hoc network. However, this network does not have a master clock. In this network, the nodes receive synchronization information via beacon packets from different nodes at different times. Each node defines a series of transmission times called Target Beacon Transmission Times (TBTT) that are Beacon-Period time units apart, where a Beacon-Period is a parameter of the network. At each TBTT, a node would listen for a beacon at a random interval and then transmit its own beacon if none arrived at the end of this interval.

On the other hand, if a beacon arrived before this random interval ends, the node would refrain from transmitting a beacon and update its local timer (or clock) with the received beacon. This process is repeated at each TBTT. In this type of network, all the nodes share responsibilities in acquiring and maintaining synchronization. Although, all the nodes in the ad-hoc network do not have to be within range of each other, the synchronization algorithm described above would work best when all the nodes are within range of each other.

Another type of network that also requires synchronization is a wireless multi-hop network with a master clock. The central controller based networks described above are not multi-hop but single-hop networks. A wireless multi-hop network is one where some or most nodes are not within the range of the node with the master clock (referred to as the "root node"). In other words, some nodes are more than one "hop" away from the root. Therefore, in order to achieve synchronization, some nodes must receive synchronization information from nodes other than the root.

An example of a multi-hop network with a master clock is a wireless version of an IEEE 1394 network where some of the wireless nodes are not in the range of the root, as described in the specification of a wired IEEE 1394 network. In order to operate properly, the local timer of all the nodes in an IEEE 1394 network must be synchronized to the timer of the root.

In a wireless 1394 network, the nodes may not be within the transmission range of all other nodes for a number of possible reasons. One obvious reason is the area coverage of the whole network is larger than the range of each node. Another reason is that the power or range of the nodes is limited intentionally to increase the overall capacity of the network and/or to reduce interference to other wireless devices in the vicinity. In this regard, the nodes in a wireless multi-hop network must acquire and maintain synchronization with a master clock.

SUMMARY OF THE INVENTION

The present invention is directed to a method of selecting nodes in a multi-hop network having a combined coverage that reaches all the nodes in the network. These nodes, called parent nodes, together with the root node transmit synchronization information regularly to the rest of the network. As part of the selection process, the parent nodes that would not interfere with each other are identified and then scheduled to transmit synchronization information in a number of channels. The parent nodes that are a predetermined number of hops from each other transmit in the same channel.

Further, a time division structure can be used to control the access of these parent nodes to a common communication channel, resulting in the efficient use of the bandwidth available. The time division structure also ensures that each node receives regular synchronization information so that it can acquire and maintain synchronization with the root node. Minimal coordination between the nodes is required to implement this method and timing structure. Further, other structures are also contemplated such as frequency division, code division and hybrids.

BRIEF DESCRIPTION OF THE DRAWINGS

Referring now to the drawings were like reference numbers represent corresponding parts throughout.

DETAILED DESCRIPTION

Figure 1:
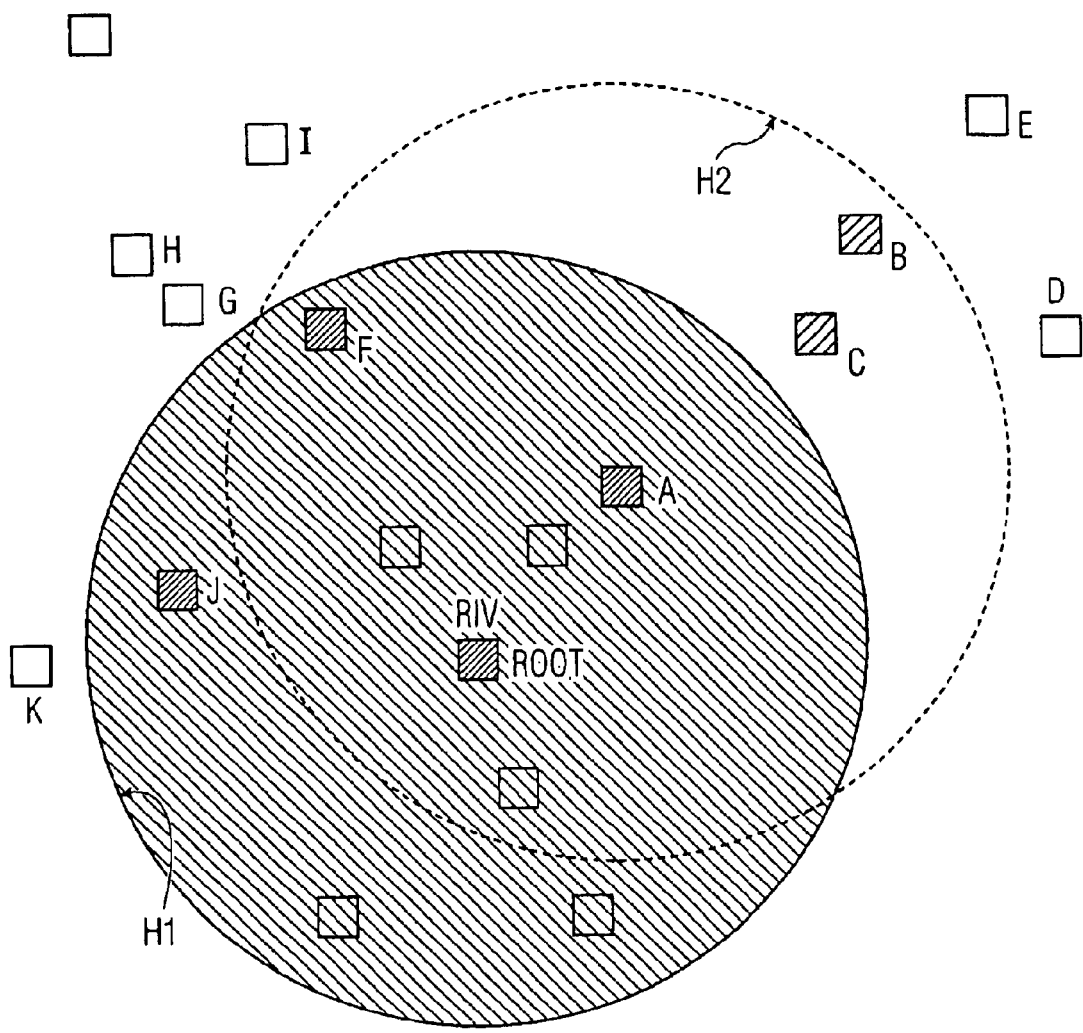
FIG. 1 is a diagram showing a wireless multi-hop network.

The present invention is directed to a method of transmitting synchronization information originating from a root node to the rest of the nodes in a multi-hop network. For the following discussion, the synchronization information is clock information. However, according to the present information, other types of synchronization information is contemplated such as global information, address books, etc.

A multi-hop network refers to a wireless network where at least one node is not in the transmission range of the other nodes in the network. The root node is the one that includes the master clock of the network. As shown in the multi-hop network of FIG. 1, node A is within the transmission range H1 of the root node RN, as indicated by the shaded circle. Thus, node A is considered to be one hop away from the root node RN. However, node B is out of the transmission range H1 of the root node RN, but in the transmission range H2 of node A. Therefore, node B is considered to be two hops away from the root node RN.

In a multi-hop network, synchronization information must be transmitted by other nodes in the network-aside from the root node to synchronize all the nodes in the network to the master clock. The root node of a wireless multi-hop network starts the synchronization process by broadcasting synchronization information at a time zero to its neighboring nodes. Upon receiving this information, these nodes adjust their local clock (or timer) to the timing of the master clock.

A subset of the nodes receiving the synchronization information, which are one hop away from the root node, called parent nodes are then selected to transmit synchronization information to neighboring nodes. Thus, the parent nodes selected transmit the same synchronization information to nodes two hops away from the root node so that these nodes can adjust their timers to the master clock of the root node. This receive-adjust-broadcast sequence continues until all the nodes including the ones farthest way from the root node adjust their timers to the correct time. If the parent nodes including the root node repeat themselves regularly, then the whole network would maintain its synchronization with the root node. Therefore, the root node and the parent nodes share the responsibility of synchronizing the whole network.

The present invention is directed to the problem of how to select the parent nodes and how to schedule the broadcasts of the synchronization information such that the parent nodes close together do not interfere with each other during transmission. At the same time, all the nodes should receive the synchronization information regularly to acquire and maintain the same time as the master clock. According to the present invention, nodes must be selected, referred to as parent nodes, having a combined coverage that reaches all of the nodes in the network. Selecting these parent nodes can be done in a number of different ways. However, it is preferable that a minimum number of nodes are selected. One way to select the parent nodes is by a "birthing procedure", as described below.

Referring to FIG. 1, let H1 and H2 be the set of nodes that are one hop and two hops away from the root node, respectively, that do not have parents yet. The "birthing procedure" then selects the smallest number of nodes in H1 such that all the nodes in H2 can be reached from the root node RN via these selected nodes.

For example, the root node RN would select node A as a parent node since node A can reach neighboring nodes B and C, which are out of the range of the root node RN. The root node RN would also select node F as a parent to reach nodes G, H and I. Further, the root node would also select Node J as a parent to reach node K. In the birthing procedure, the nodes selected as parents would be grouped as a set known as children. Therefore, nodes A, F and J would be considered children of the root node RN.

The "birthing procedure" described above would then be performed by the children of the root node RN in order to reach nodes that are three hops away from the root node RN. For example, Node A would then select Node B as a parent in order to reach Nodes E and B. Further, this birthing procedure would then be performed for the rest of the network until enough parents are selected to provide a combined coverage that reaches all of the nodes in the network.

After the "birthing procedure" is performed, the root and parent nodes then broadcast synchronization information regularly to the rest of the nodes. This would enable synchronization with the master clock to be acquired and maintained by all the nodes in the network. In the process of selecting the parent nodes, the invention also identifies and partitions them into groups. Parent nodes that are the same number of hops away from the root node are grouped together.

Further, parent nodes that are at least three hops away from each other with respect to the root node are also grouped together. It should be clear that the parent nodes that are at least three hops away from each other can transmit at the same time and not interfere with each other. A time division scheme then can be used to transmit the synchronization information by the groups in non-overlapping (in time) logical channels.

Figure 2:
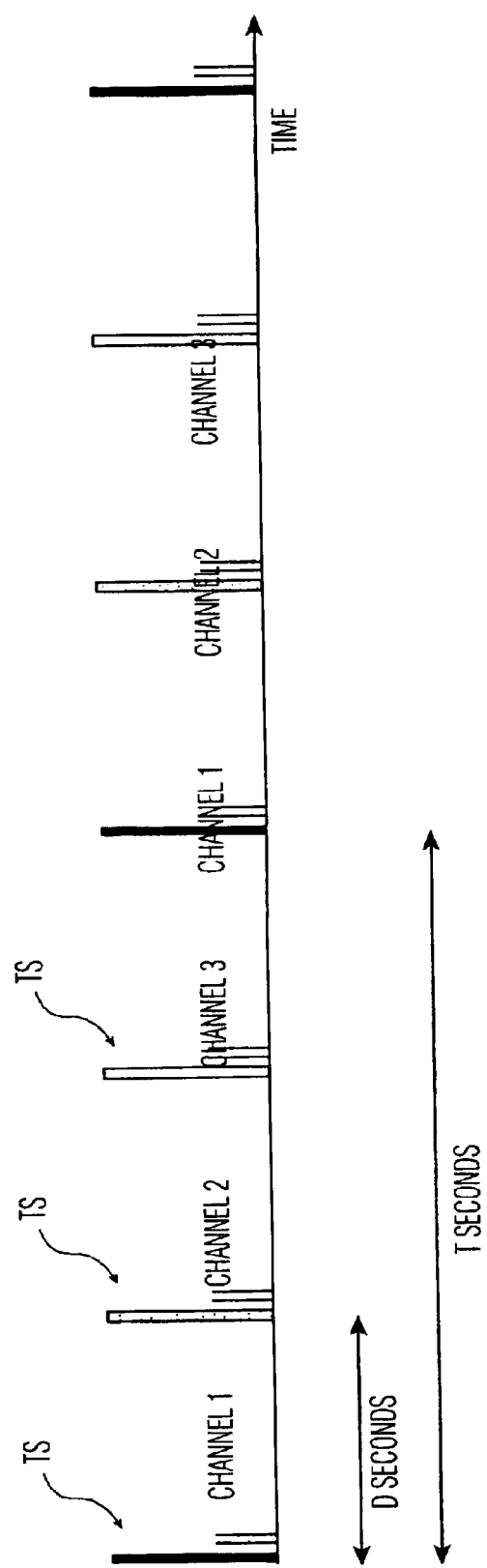
FIG. 2 is a diagram showing one example of a scheme for transmitting synchronization information according to the present invention.

One example of a scheme for transmitting the synchronization information according to the present invention is shown in FIG. 2. The scheme shown in FIG. 2 includes a time division structure. However, other structures are also contemplated by the present invention such as frequency division (FDM), code division (CDM) and hybrids. Further, an order sequence of channels in FDM or CDM may be agreed upon ahead of time.

As can be seen from FIG. 2, the communication channel is divided into three non-overlapping logical channels in time, Channels 1 to 3. Each channel corresponds to the above-described grouping of parent nodes. Thus, in this example, the parent nodes have been divided into three groups. Each channel consists of intervals that are D seconds in duration. The intervals of each of the channels repeat every T seconds, where T=3×D. Each channel also has time slots TS allotted at the beginning of each interval. The three channels and intervals are time-multiplexed together as shown in FIG. 2. Further, synchronization information in the form of Clock-Packets are transmitted by parent nodes which have been assigned a particular time slot and channel.

The following are procedures for implementing the above-described time division scheme of FIG. 2. As a result of the applying these procedures to all the nodes in the network, parent nodes that are at least three hops apart with respect to the root node are scheduled to broadcast Clock-Packets in the same channel. In other words, parent nodes that are sufficiently far apart and that would not interfere with each other will be scheduled to transmit at the same time, resulting in an efficient use of the available bandwidth. Further, if more than one parent node is selected in the same hop, then these parent nodes also transmit in the same channel, but in different time slots. The root node together with the parent nodes transmit Clock-Packets every T seconds so that all of the nodes maintain synchronization with the master clock of the root node.

Initially, the root node performs the previously described "birthing procedure" to select a subset of children nodes, which are included as a list in the Clock-Packets transmitted by the root node. Further, at a later time, the other parent nodes in the network will also run the "birthing procedure" to select subsets of children nodes, which are also included as lists in the Clock-Packets transmitted by these parent nodes.

After performing the "birthing procedure", both the root node and parent nodes will transmit Clock-Packets to all of its children nodes. For example, the root node would transmit these Clock-Packets at the time zero and every T seconds thereafter to all of its children nodes. The transmission of the Clock-Packets marks the beginning of Channel 1. Therefore, the root node is a parent node having a hop number of "0" included in its Clock-Packet.

After receiving the Clock-Packets from the parent nodes including the root node, each of the children nodes enter the initialization phase. The initialization phase includes, upon reception of a first Clock-Packet, each child node setting a timer to a predetermined time period of T (or more) seconds and then listening for Clock-Packets from other parents.

When the timer expires, each child node determines the smallest hop number and the corresponding node address for all of the Clock-Packets received. For example, if the smallest hop number received by a child node is "Hmin" and the corresponding node address is "Naddr", then node "Naddr" is now this child nodes parent and its hop number is "Hmin+1". This particular child node will then transmit a packet indicating that it has selected "Naddr" as its parent.

After the above-described initialization phase is completed, each of the children nodes then wait for the next Clock-Packet from its parent node. Upon receiving the next Clock-Packet, each of the children nodes check whether it is included in the list of children of the Clock-Packet received. If a node is included in this list of children nodes, it becomes a parent node in the next channel and will transmit Clock-Packets D seconds later or in the next channel. If a node is not included in this list of children, then it does not transmit any Clock-Packets. Further, if at any time, a node receives a Clock-Packet with a smaller hop number than its parents hop number, it shall go back and perform the above-described initialization phase in order to reschedule the transmission of its Clock-Packets.

In order to transmit packets other than Clock-Packets (e.g. data packets), all the nodes may use the "listen before-talk" scheme during the start of the any interval to avoid interfering with Clock-Packets from other nodes. The nodes could also use information about the number of siblings and/or number of children from Clock-Packets received in the current and previous intervals to determine how many slots to defer its transmission in the current interval to avoid interfering with other Clock-Packets.

After being selected as described above, each parent node will begin to receive Clock-Packets from its parent node and transmit Clock-Packets to the children nodes in the same hop. However, in this regard, the root node is an exception since it does not have a parent node. The parent nodes then assign a unique slot number to each child and update its Clock-Packets with this information. If a parent node receives a packet that indicates one of its child nodes has selected another parent, it shall remove that child node from the list of children included in its Clock-Packet and then reschedule the slot numbers for the remaining children nodes.

The number of siblings a parent node has is equal to the number of children listed in the Clock-Packets it receives from its parent node. Further, a parent node transmits its Clock-packets in the channel (D seconds later) immediately after the channel of its parent and every T seconds thereafter. Further, the parent node transmits the Clock-Packets in the slot number specified in the Clock-Packet received from the parent. However, the specified slot number may change with time. In one situation, a parent node may find out that its Clock-Packets being transmitted to another node in the same hop is not being received due to collisions with Clock-Packets from another nearby parent. If this occurs, this parent node would then request that its parent node change the time-slot at which it transmits the Clock-Packets.

An example illustrating operation of the present invention using the time division scheme of FIG. 2 is shown in FIGS. 3–8. In order to make the example clearer and more concise, it is assumed that the nodes can select its parents and then transmit Clock-Packets immediately after being selected as a parent node. In other words, the nodes in this example do not have to wait T seconds to select its parent nodes. For this example, all the nodes in the network would be synchronized to the root after five intervals. In order to maintain synchronization, the nodes would just repeat the broadcasts in the previous three intervals (or T seconds) in the succeeding intervals.

Figure 3:
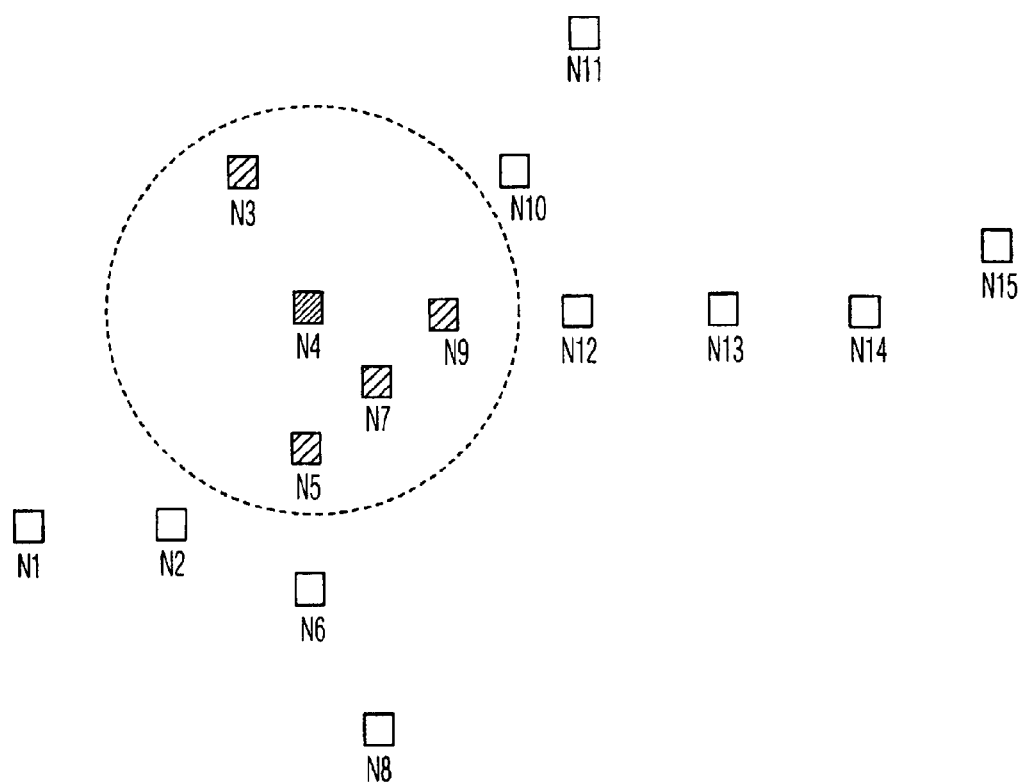
FIGS. 3–8 are diagrams illustrating operation of the present invention using the time division scheme of FIG. 2.
Figure 8:
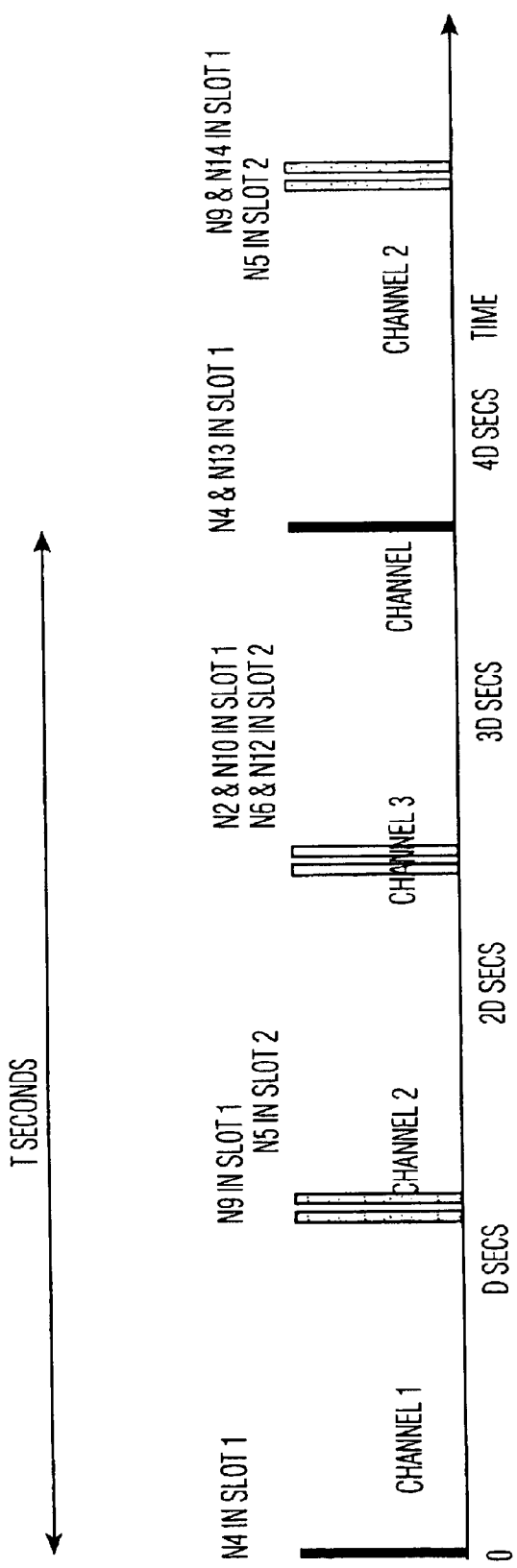

As illustrated by FIGS. 3 and 8, in interval 0 to D, the root node N4 runs the previously described birthing procedure and then transmits Clock-Packets at time zero, which marks the beginning of Channel 1. All the nodes in the hop of the root node N4, namely N3, N5, N7 and N9, will have a hop number equal to 1. The Clock-Packets transmitted by the root node N4 will indicate that nodes N9 and N5 are its children and that these nodes are assigned to broadcast in slot 1 and 2, respectively of the next channel. In this situation, nodes N9 and N5 must transmit in different time slots otherwise these nodes would interfere with each other. Further, N4 is also the parent of nodes N3 and N7. However, these nodes were not selected to broadcast synchronization information by the birthing procedure.

Figure 4:
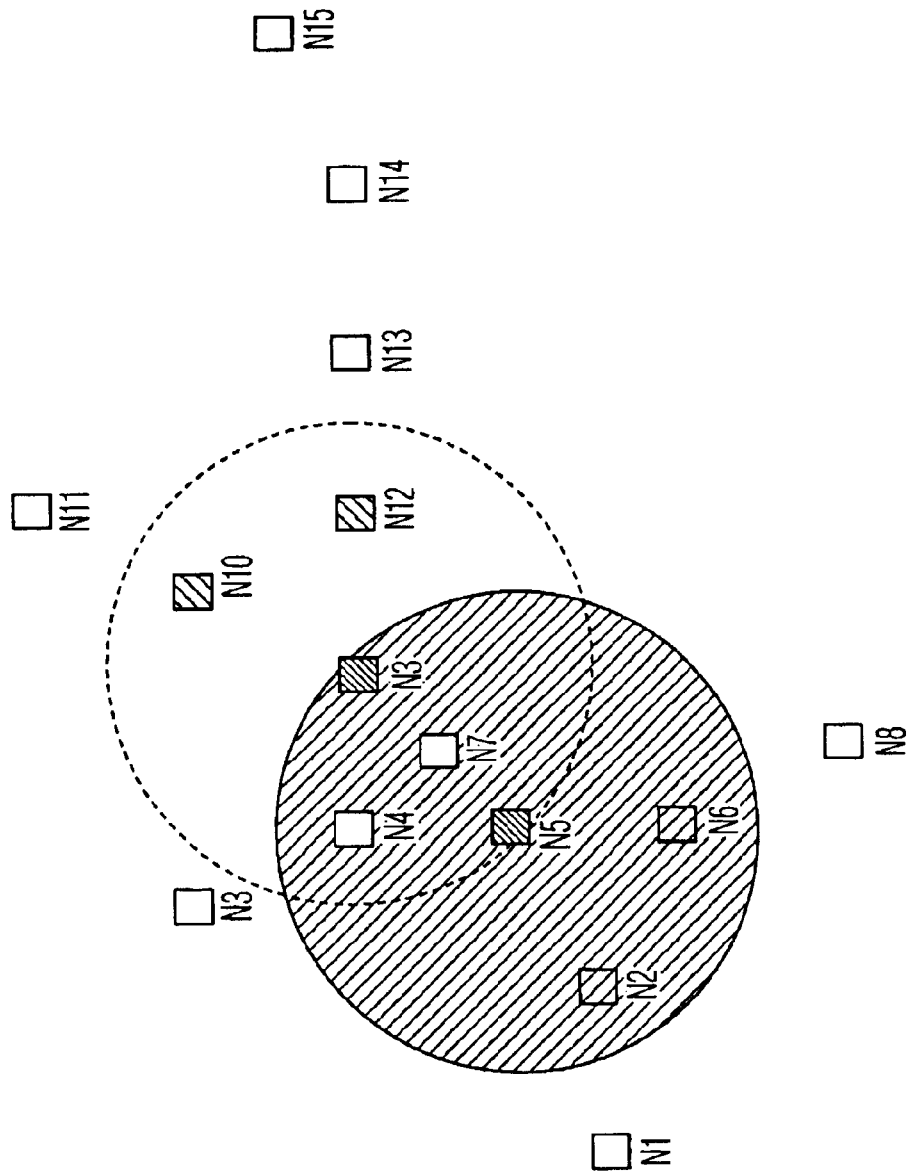

As illustrated by FIGS. 4 and 8, in interval D to 2D, nodes N9 and N5 transmit Clock-Packets in slot 1 and 2 respectively of Channel 2. Further, node N5 indicates in its Clock-Packet that N2 and N6 are its children and that nodes N2 and N6 are assigned to transmit in slot 1 and 2, respectively of the next channel. The Clock-Packet of N9 indicates that N10 and N12 are its children and that they are assigned to broadcast in slot 1 and 2, respectively of Channel 3. Nodes N4, N5, N7 and N9 will ignore the Clock-Packets received in this interval since these nodes have a hop number that is equal to the ones in the Clock-Packets transmitted by nodes N5 and N9.

Figure 5:
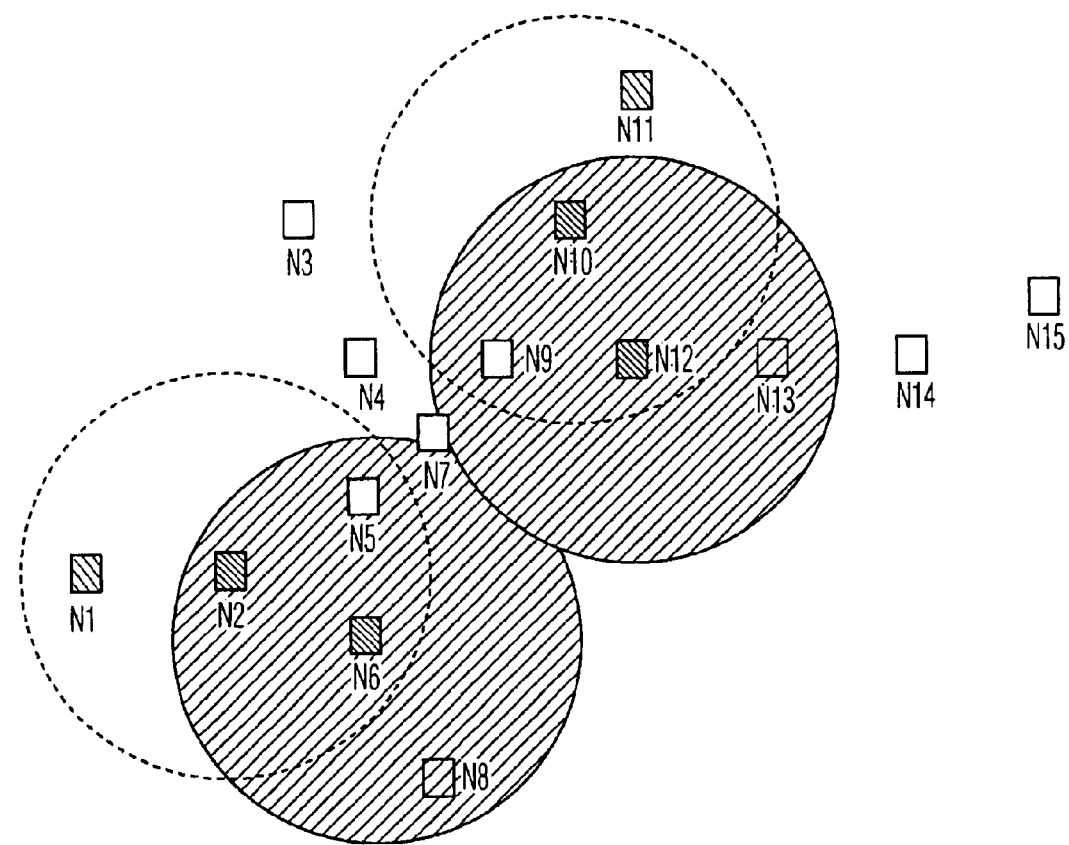

As illustrated by FIGS. 5 and 8, in interval 2D to 3D, nodes N2 and N10 transmit Clock-Packets in slot 1 of Channel 3. While nodes N6 and N2 transmit Clock-Packets in slot 2 of channel 3. Further, node N12 will select N13 as its child, which will be indicated in the Clock-Packets it transmits. At this time nodes N2, N6 and N10 do not have any children since they are no nodes in the same hops to select.

Figure 6:
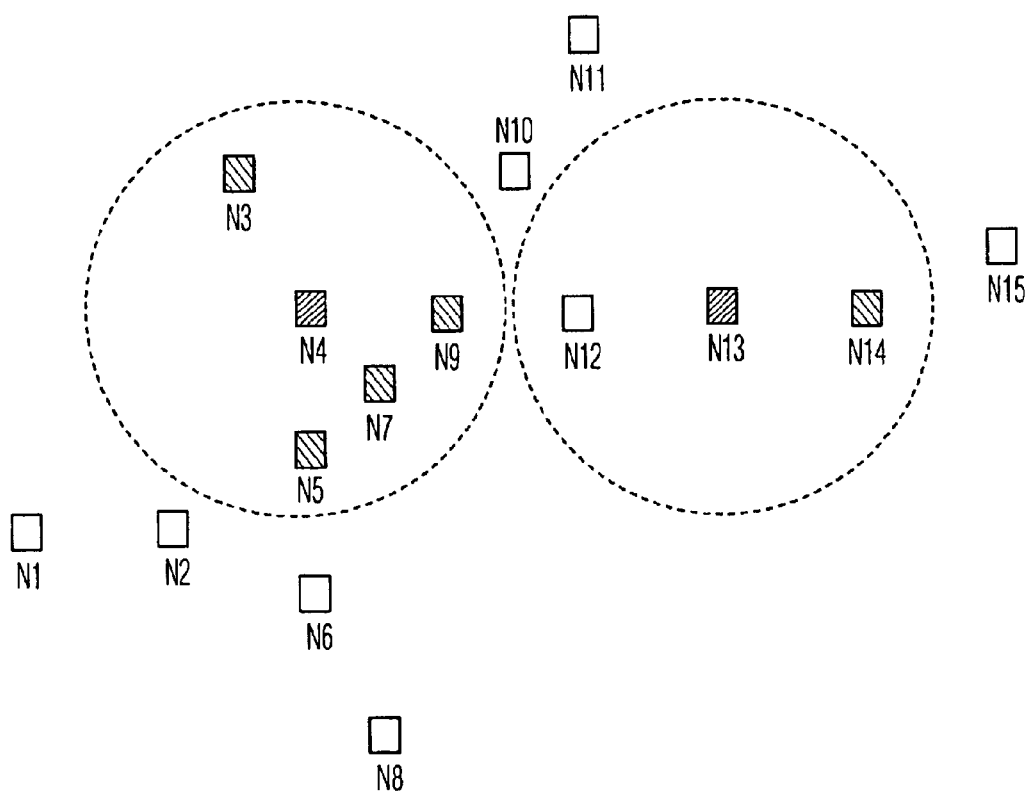

As illustrated by FIGS. 6 and 8, in interval 3D to 4D, the root node N4 and node N13 transmit Clock-Packets in slot 1 of Channel 1. The nodes N4 and N14 are three hops away and thus do not interfere with each other. Further the node N13 will select N14 as its child.

Figure 7:
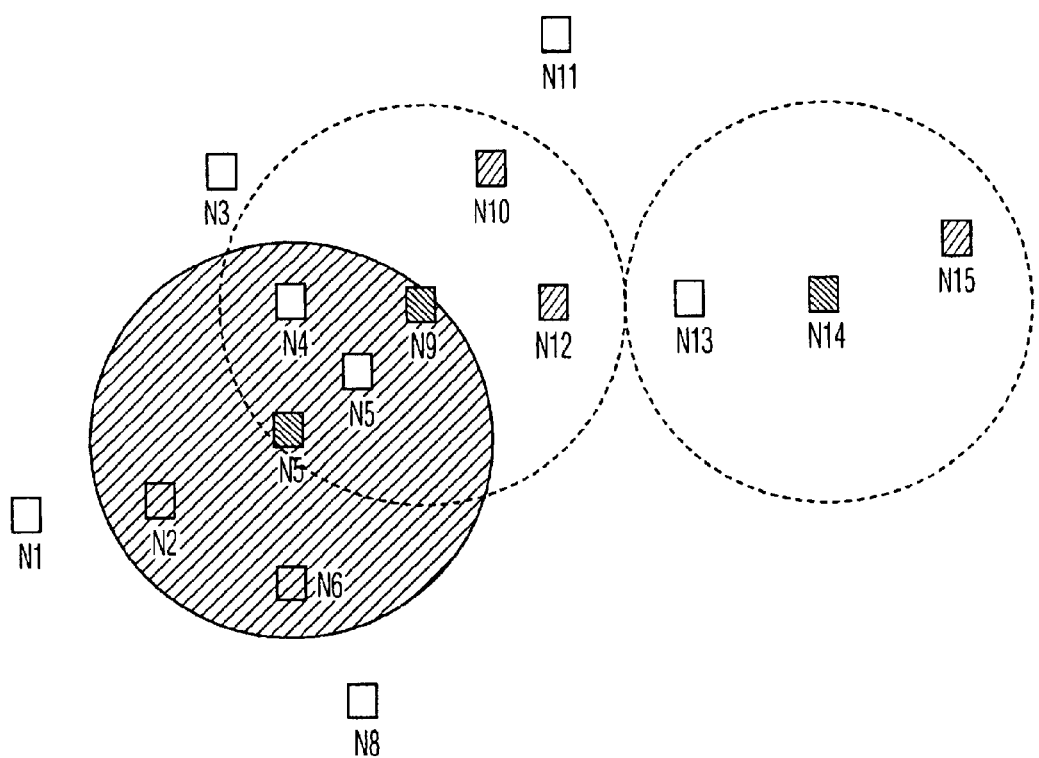

As illustrated by FIGS. 7 and 8, in interval 4D to 5D, nodes N9 and N14 transmit Clock-Packets in slot 1 of Channel 2. While node N5 transmits Clock-Packets in slot 2 of channel 2. At this time, node N14 does not select any children since there are no nodes in the hop to select.

The following are definitions that apply to the foregoing description of the present invention:

Parent—a node that transmits synchronization information (see Clock-Packet) to other nodes;

Cell—a cell is the set of nodes that uses the synchronization information from the same parent;

Child—Let C be a parent node. A node is said to be a child of C if the node belongs to the cell of C and is also a parent. Not all nodes in a cell are children, i.e. not all the nodes in a cell are required to transmit synchronization information to other nodes;

Siblings—two or more nodes are said to be siblings if they are the children (child nodes) of the same parent;

Listen—before-talk scheme—a transmission scheme wherein a node would only transmit when the channel is "silent", i.e. no energy detected in its transmission frequency, for a sufficient amount of time to avoid collision;

Clock-Packet—a broadcast packet includes the clock information, e.g. value of timer counter, and the node address of the transmitter. It also includes a hop number. The hop number is useful in situation when one node receives Clock-packets from more than one parent. It shall also include the most recent list of the parent's children, their corresponding slot number, and the number of siblings the parent has;

Time zero—defined as the time when the root node broadcasts a first Clock-packet. All references to time will use this "time zero" as a reference;

T—the time in seconds between transmission of Clock-packet by the root; the same value T is used by all parents. The value of T is chosen so that all the nodes in the wireless network can maintain synchronization with the root node within an acceptable error when two Clock-packets are received in a node within T seconds;

N—a parameter of the synchronization algorithm (or method), N must be greater or equal to 3. In the discussion above, N=3 unless otherwise stated;

D—T/N (T divided by N), N=3.

The foregoing description of the present invention have been presented for the purposes of illustration and description. It is not intended to limit the invention to the precise forms disclosed. Many modifications and variations are possible in light of the above teachings. Therefore, it is not intended that the scope of the invention should be limited by the detail description.

What is claimed is:

1. A method for transmitting synchronization information in a multi-hop wireless network, the method comprising the steps of:

selecting parent nodes in the network to transmit synchronization information to children nodes; and transmitting the synchronization information from the parent nodes in a number of channels, wherein the parent nodes being a predetermined number of hops from each other transmit in one channel;

wherein the selecting of parent nodes includes:

(i) receiving by a particular child node a first clock packet from a particular node identifying the particular child node as its own child node;

(ii) entering an initialization phase wherein the particular child node sets a timer for a predetermined period of time T and listens for clock packets from other nodes that seek to be selected as a parent node for the particular child node;

(iii) upon expiration of the predetermined period of time T the particular child node determining which of the parent nodes has a smallest hop number in its clock packet, and selecting as a parent node the node having the smallest hop number; and (iv) the particular child node transmitting a packet to the node selected in step (iii) to inform the node that it has been selected by the particular child node to be the parent node of the particular child node.

2. The method of claim 1, wherein the parent nodes include at least one node from each hop in the network to transmit the synchronization information to at least one of-the children nodes in an adjacent hop.

3. The method of claim 1, wherein one of the parent nodes is a root node providing the synchronization information and having a smallest possible hop number in its clock packet.

4. The method of claim 1, wherein further comprising the steps of:

monitoring a hop number from subsequent clock packets received by the particular child node; and performing sub-steps (ii), (iii) and (iv) by the particular child node to reschedule a transmission of clock packets if the particular child node receives a clock packet with a smaller hop number than the parent node of the particular child node.

5. The method of claim 1, wherein a minimum number of parent nodes are selected having a combined coverage to reach all nodes of the network.

6. The method of claim 1, wherein the channels are selected from a group consisting of time division channels, frequency division channels, code division channels and hybrids thereof; and wherein parent nodes having a difference in respective hop numbers of at least three hops are permitted to transmit at a same time on a same channel.

7. The method of claim 1, wherein the parent nodes include multiple nodes from one hop and the multiple nodes from one hop transmit in a different sub-division of one of the channels.

8. A method for transmitting synchronization information in a multi-hop wireless network, the method comprising the steps of:

selecting parent nodes in the network to transmit synchronization information to children nodes;

dividing the parent nodes into a number of groups, wherein each of the groups include parent nodes being a predetermined number of hops from each other; and transmitting the synchronization information from the parent nodes in a number of channels, wherein each of the groups corresponds to one of the channels_wherein wherein the selecting of parent nodes includes:

(i) receiving by a particular child node a first clock packet from a particular node identifying the particular child node as its own child node;

(ii) entering an initialization phase wherein the particular child node sets a timer for a predetermined period of time T and listens for clock packets from other nodes that seek to be selected as a parent node for the particular child node;

(iii) upon expiration of the predetermined period of time T the particular child node determining which of the parent nodes has a smallest hop number in its clock packet, and selecting as a parent node the node having the smallest hop number; and (iv) the particular child node transmitting a packet to the node selected in step (iii) to inform the node that it has been selected by the particular child node to be the parent node of the particular child node.

9. The method of claim 8, wherein the parent nodes include at least one node from each hop in the network to transmit the synchronization information to at least one of the children nodes in an adjacent hop.

10. The method of claim 8, wherein one of the parent nodes is a root node providing the synchronization information and having a smallest possible hop number in its clock packet.

11. The method of claim 8, wherein the predetermined number of hops is at least three hops, and said method further comprising the steps of:

monitoring a hop number from subsequent clock packets received by the particular child node; and performing sub-steps (ii), (iii) and (iv) by the particular child node to reschedule a transmission of clock packets if the particular child node receives a clock packet with a smaller hop number than the parent node of the particular child node.

12. The method of claim 8, wherein the synchronization information is transmitted in a packet including a hop number of the parent nodes and a list of the children nodes of the parent nodes transmitting the packet.

* * * * *